June 17, 1941.  W. H. WOOD ET AL  2,246,476
HYDRAULIC TABLE RECIPROCATING MECHANISM
Filed Nov. 9, 1940  2 Sheets-Sheet 1

Inventor
WALLACE H. WOOD
CARL G. FLYGARE
By Harold W. Eaton
Attorney

June 17, 1941.  W. H. WOOD ET AL  2,246,476
HYDRAULIC TABLE RECIPROCATING MECHANISM
Filed Nov. 9, 1940   2 Sheets-Sheet 2
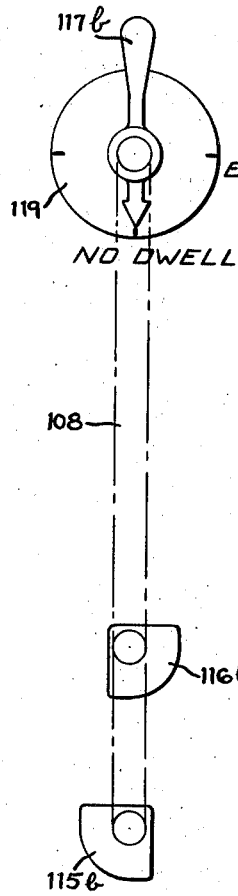
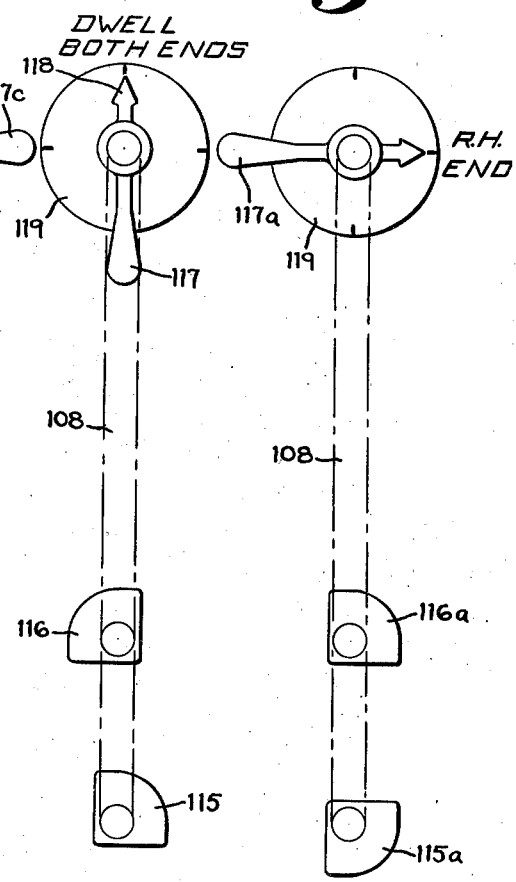
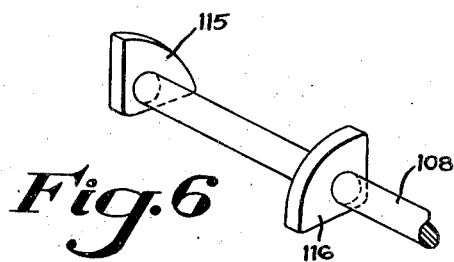
Inventor
WALLACE H. WOOD
CARL G. FLYGARE
By Harold W. Eaton
Attorney Patented June 17, 1941

2,246,476

UNITED STATES PATENT OFFICE 2,246,476

HYDRAULIC TABLE RECIPROCATING MECHANISM

Wallace H. Wood and Carl G. Flygare, Worcester, Mass., assignors to Norton Company, Worcester, Mass., a corporation of Massachusetts Application November 9, 1940, Serial No. 365,130

9 Claims. (Cl. 121—45)

The invention relates to grinding machines, and more particularly to a table reciprocating mechanism.

One object of the invention is to provide a simple and thoroughly practical hydraulically operated table reciprocating and reversing mechanism. Another object of the invention is to provide a table reversing mechanism with an electrically controlled dwell control mechanism. Another object of the invention is to provide a table reciprocating mechanism with a dwell control mechanism whereby a variable dwell may be obtained at either, neither, or both ends of the table reciprocatory stroke.

A further object of the invention is to provide a hydraulically operated table reciprocating mechanism with an electrically operated adjustable time delay relay whereby an adjustable but predetermined dwell may be obtained at either or both ends of the table stroke. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of the invention, Fig. 1 is a combined hydraulic and electrical diagram of the improved table reciprocating mechanism;

Fig. 2 is a diagrammatic showing of the control mechanism for the table dwell set in a no dwell position;

Fig. 3 is a similar diagrammatic view, showing the control mechanism set for a dwell at the left-hand end of the table stroke;

Fig. 4 is a similar fragmentary view with the control set for a dwell at both ends of the table stroke;

Fig. 5 is a similar view showing the control set for a dwell at the right-hand end of the table stroke;

Fig. 6 is a fragmentary perspective view, on an enlarged scale, of the dwell control dogs shown in position to provide a dwell at both ends of the table stroke.

Figure 1:
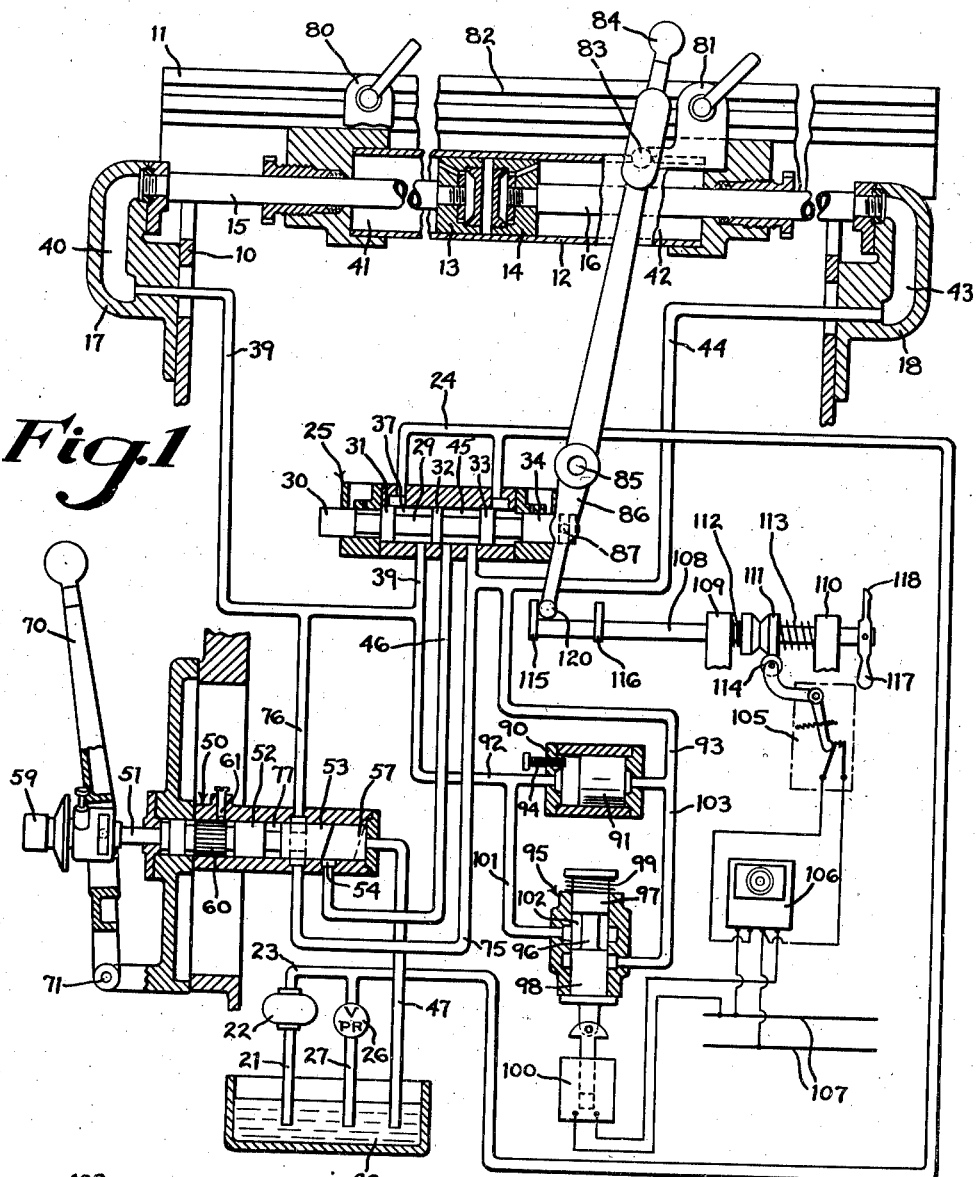
Figure 7:
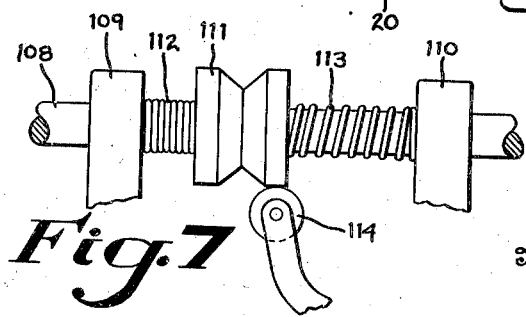
Fig. 7 is a fragmentary elevation, on an enlarged scale, of the mechanism for actuating the table dwell switch.

As shown in the drawings, a machine embodying this invention may comprise a base 10 which supports a longitudinally movable work supporting table 11 on the usual V-way and flat way (not shown) for a longitudinal reciprocating movement relative to the base 10.

A fluid pressure operated reciprocating mechanism is provided to reciprocate the work table 11, comprising a fluid pressure cylinder 12 which is fixedly mounted to the under side of the table 11. The cylinder 12 contains a pair of spaced pistons 13 and 14 which are connected by a pair of hollow piston rods 15 and 16, respectively, with a pair of hollow brackets 17 and 18, respectively, which are fixedly mounted on opposite ends of the base 10.

In the preferred construction the base 10 is formed having a hollow, box-like portion which serves as a reservoir 20 for the fluid pressure system. Fluid is drawn from the reservoir 20 through a pipe 21 by means of a motor driven fluid pressure pump 22 and is forced through a pipe 23 and a passage or pipe 24 to a table control valve 25. A fluid pressure relief valve 26 is provided in the pipe line 23 which is arranged to allow excess fluid under pressure within the fluid system to by-pass through a pipe 27 into the reservoir 20 in case the pressure within the fluid system increases above a desired and predetermined pressure.

The control valve 25 is preferably a piston type valve comprising a movable valve stem 29 having formed integrally therewith a plurality of valve pistons 30, 31, 32, 33 and 34. Fluid under pressure from the pump 22 is forced through the pipes 23 and 24 into a valve chamber 37 located between the valve pistons 31 and 32 and passes outwardly through a pipe 39 into an aperture 40 in the bracket 17, through the hollow piston rod 15 and piston 13 into a cylinder chamber 41 to cause the cylinder 12 and table 11 to move in a direction toward the left (Fig. 1). During movement of the table toward the left, fluid within a cylinder chamber 42 is exhausted through the piston 14, the hollow piston rod 16, and an aperture 43 within the bracket 18, and through a pipe 44 into a valve chamber 45 between the valve pistons 32 and 33, respectively, and out through a pipe 46 which returns exhaust fluid through a pipe 47 into the reservoir 20.

A speed control valve 50 is preferably formed integral with the valve 25. As illustrated in the diagram (Fig. 1), the valve 50 is shown as a separate valve unit. The valve 50 is located in the exhaust side of the system. The valve 50 comprises a valve stem 51 which is provided with valve pistons 52 and 53. The casing of the valve 50 is provided with a port 54 which is located at the end of the pipe 46, conveying fluid from either the valve chamber 37 or 45, depending upon the position of the valve 25. The passage or exhaust pipe 47 serves to exhaust fluid from a throttle valve chamber 57 into the reservoir 20 within the base 10 of the machine.

The throttle valve 50 is arranged so that it may be moved longitudinally from a full line position into a dotted line position. The valve 50 is provided with an actuating knob 59 on the front end of the valve stem 51 which permits the valve to be rotated. The end of the valve piston 53, instead of being a plane surface at right angles to the axis of the throttle valve, is arranged at an angle thereto. By providing an angularly positioned end surface on the valve piston 53, any rotary motion of the valve pistons serves as a fine adjustment to cut off more or less of the port 54 precisely to regulate the exhaust of fluid from the system and thereby permit a fine regulation of the table speed.

In order that the valve piston 53 may be maintained in the desired adjusted position so as to enable the table 11 to be stopped and started as desired without changing the speed adjustment, a serrated or notched portion 60 is provided which is formed as an integral part of the valve stem 51. A spring-pressed plunger 61 engages notches in the serrated portion 60 and serves to hold the valve in its adjusted position so as to permit longitudinal or axial movement of the valve stem 51 by means of a control lever 70 to stop and start the movement of the table 11 without upsetting the speed adjustment of the valve 50.

The control lever 70 is pivotally mounted on a stud 71 which is fixedly mounted on the base 10 of the machine. The lever 70 is operatively connected to move the valve stem 51 in an axial direction but permits a rotary motion of the valve to facilitate a control of the table speed. The details of construction of the connection between the control lever 70 and the valve stem 51 have not been illustrated in detail in the present application, since they are not considered to be part of the present invention. This mechanism is substantially the same as that shown in the prior U. S. patent to Wallace H. Wood, No. 2,161,216 dated June 6, 1939, to which reference may be had for details of disclosure not contained herein.

When the throttle valve 50 is in its right-hand end position (Fig. 1), that is, when the control lever 70 is moved in a clockwise direction to stop the hydraulic table movement, it is desirable to provide a suitable by-pass whereby fluid may readily pass from the cylinder chamber 41 at one end of the cylinder 12 to the cylinder chamber 42 at the other end thereof. A pipe 75 is provided to connect the pipe 44 and the valve chamber 45 with a passage or pipe 76. When the throttle valve 50 is in a closed position, that is, a right-hand end position (Fig. 1), fluid may readily pass from the cylinder chamber 41 through the pipe 39, the pipe 76, through a valve chamber 77 located between the valve pistons 52 and 53, through the pipe 75, through the pipe 44, and into the cylinder chamber 42. This by-pass in the throttle valve interconnects the cylinder chambers 41 and 42 so that when the fluid pressure system is shut off by closing the throttle valve 50, the table 11 may be moved manually without the necessity of overcoming fluid pressure within the system.

A reversing mechanism is provided for changing the direction of movement of the table 11 as desired. A pair of adjustable table dogs 80 and 81 are adjustably mounted in a T-slot 82 formed in the front edge of the table 11. The dogs 80 and 81 are arranged to engage a stud 83 which is fixedly mounted on the upper end of a reversing lever 84. The reversing lever 84 is fixedly mounted on the forward end of a rock shaft 85 which is rotatably supported in fixed relation with the base 10 of the machine. The shaft 85 also supports a downwardly extending lever 86 which is connected by means of a stud 87 with a groove cut in the periphery of the valve piston 34. It will be readily apparent from the foregoing disclosure that when the reversing lever 84 is shifted in either direction by means of the table reversing dogs 80 and 81, a shifting movement will be imparted to the reversing valve 25 to reverse the direction of flow of fluid under pressure to the table cylinder 12 thereby to change the direction of movement of the work table 11.

The fluid pressure system is so arranged that the table reversal takes place very rapidly and in some cases reverses so rapidly that the cylindrical piece of work being ground does not have an opportunity to rotate through one complete rotation to allow the wheel to grind out before the table starts its movement in the reverse direction. In order to provide a slight but predetermined dwell, a shuttle valve 90 is provided which is preferably so constructed and so connected in the system that upon reversal of the reversing valve 25, the initial change in direction of fluid in the system moves through the easiest course and instead of being transmitted immediately to the opposite end of the cylinder 12, serves to move a shuttle valve piston 91 which is slidably mounted within the shuttle valve casing 90. The opposite ends of the shuttle valve are connected by pipes 92 and 93 with pipes 39 and 44, respectively.

It is desirable to provide a mechanism whereby the extent of dwell at the ends of the table stroke may be varied as desired. To accomplish this result, an electrically controlled dwell control mechanism is provided, comprising a normally closed valve 95. The valve 95 is a piston type valve comprising a valve stem 96 having formed integrally therewith valve pistons 97 and 98. The valve 95 is held in its uppermost position (Fig. 1) by means of a compression spring 99. A solenoid 100 is provided which when energized shifts the valve pistons 97 and 98 downwardly to open the valve 95. A pipe 101 is connected between a valve chamber 102 in the valve 95 and the pipe 92. A pipe 103 is connected between the valve 95 and the pipe 93 so that the valve 95 is connected in parallel with the shuttle valve 90. When the solenoid 100 is energized, the pipe 101 is connected through the valve chamber 102 with the pipe 103, thus forming a direct connection between the cylinder chambers 41 and 42, respectively.

An electrical control mechanism is provided for controlling the energization of the solenoid 100 in timed relation with the movement of the reversing lever 84 and the reversing valve 25. A normally open switch 105 is operatively connected with the solenoid 100 and also with an adjustable electrical time delay relay 106. Power is supplied from an outside source, as indicated by the electric power lines 107.

In order that the switch 105 may be closed automatically in timed relation with the shifting movement of the reverse lever 84, a slidably mounted rod 108 is supported in bearings 109 and 110. A spool-shaped member 111 is fixedly mounted on the rod 108 and is arranged to engage and actuate an actuating roller 114 of the limit switch 105. When the reversing lever shifts the rod 108 toward the left into the position illustrated in Fig. 1, the member 111 rocks the roller 114 in a counterclockwise direction to close the switch 105. The closing of the switch 105 energizes the solenoid 100 and at the same time sets the time delay relay 106 in motion. The energization of the solenoid 100 serves to open the valve 95 so that fluid may readily by-pass between the two sides of the system. A pair of balanced springs 112 and 113 surround the rod 108 and are interposed between the bearing 109 and the spool 111 and between the spool 111 and the bearing member 110, respectively.

The rod 108 is provided with a pair of dogs 115 and 116. The dogs 115 and 116 are preferably arranged in fixed relationship on the shaft 108. The dogs 115 and 116 (Figs. 1, 4 and 6) are both arranged to extend upwardly in the path of a downwardly extending arm 120 which is fixedly connected on the rock shaft 85 to move with the reversing lever 84.

For certain types of grinding, it may be desirable to grind with no dwell at the ends of the table stroke, or it may be desirable to provide an adjustable dwell at either the right-hand or left-hand end of the table stroke, or it may be desirable to provide an adjustable dwell at both ends of the reciprocatory stroke of the table 11.

The dogs 115 and 116 are preferably sector-shaped (Figs. 2 to 5 inclusive) and in the position as shown in Figs. 1 and 4, both of the sectors are arranged to project upwardly into the path of the roller 114 so that the electrically operated dwell control mechanism is operated at both ends of the reciprocatory stroke of the table 11.

A manually operable control knob 117 is mounted on the end of the shaft 108. The knob 117 is provided with a pointer or index 118 which cooperates with a dial 119. The dial 119 is preferably fastened to the front of the machine base 10. If it is desired to provide a dwell only at the right-hand end of the table stroke, the control knob 117 is moved into the position 117a (Fig. 5) which shifts the dogs 115 and 116 into positions 115a and 116a, in which positions only the dog 116a lies within the path of the arm 120 so as to provide an actuation of the electrical dwell to produce a period of dwell at the right-hand end of the table stroke. In this position the dog 115a is turned so that it is out of the path of the arm 120 as the reversing lever swings into the position illustrated in Fig. 1.

If no dwell is desired at either end of the table stroke, the control knob 117 is shifted into position 117b to position the dogs 115 and 116 into positions 115b and 116b, in which positions both of the dogs are out of the path of the arm 120 so that the electrical dwell control mechanism is not actuated when the reversing lever 84 is shifted.

Similarly, if a dwell is desired at the left-hand end of the table stroke, the control knob 117 is moved into position 119c to position the dogs 115 and 116 in positions 115c and 116c, in which position the dog 115c lies in the path of the arm 120 while the dog 116c is out of the path of the arm 120, thus actuating the electrical dwell control mechanism only to provide a dwell at the left-hand end of the table stroke.

When either or both of the dogs 115 and 116 is positioned out of the path of the arm 120, the balanced springs 112 and 113 serve to hold the spool-shaped member 111 in a central position with the actuating roller 114 of the switch 105 positioned in the groove formed in the periphery of the member 111. As the reversing lever 84 is moved either in a clockwise or counterclockwise direction, the arm 120 recedes from engagement with the dog 115 or the dog 116 and the released compression of the spring 112 or spring 113, respectively, returns the spool-shaped member 111 to a central or neutral position. This movement allows the roller to rock in a clockwise direction into the groove formed in the spool-shaped member 111, thus opening the switch 105. If either of the dogs 115 or 116 is positioned out of the path of the arm 117, the spool-shaped member remains in a central position, maintaining the switch 105 open.

When the electrical time delay mechanism is utilized for providing an adjustable but predetermined dwell, the shuttle valve 111 serves merely to cause a slight dwell when the reversing lever 84 is shifted to change the direction of flow of fluid to the cylinder 12. This dwell as provided by the shuttle valve 90 allows only a sufficient time interval for the switch 105 to close, thus energizing the solenoid 100 to shift the valve 95 downwardly, thus opening the by-pass between the cylinder chambers 41 and 42. The valve 95 remains in this downward open position for a predetermined and definite time interval as governed by an adjustable electric time delay relay 106. After the set time interval as governed by the relay 106, the circuit is broken to energize the solenoid 103 and the released compression of the spring 99 rapidly moves the valve 95 upwardly into a closed position, as shown in Fig. 1.

The operation of the improved hydraulically operated, electrically controlled table reciprocating mechanism will be readily apparent from the foregoing disclosure. The table dogs 80 and 81 are adjusted along the T-slot 82 to provide the desired reciprocatory stroke of the work supporting table 11. The lever 70 is then moved in a counterclockwise direction into the position illustrated in Fig. 1 to open the valve 50 so as to allow fluid to exhaust through the port 54. The speed of the table 11 may then be regulated to obtain the desired reciprocating speed by rotation of the knob 59. The electric time delay relay 106 is then set to provide a predetermined period of dwell at the ends of the table stroke. The control knob 117 is then moved to the desired position to provide no dwell at either end of the table stroke, a dwell at either the right-hand or the left-hand end of the table stroke, or a dwell at both ends of the table stroke according to the nature of the work being ground. The table reciprocation is then continued with the parts positioned as shown in Fig. 1. The dogs 115 and 116 being set for a dwell at both ends of the table stroke, each time the reversing lever 84 is shifted, the rod 108 will be shifted endwise and the cam action of the spool-shaped member 111 on the switch actuating roller 114 will close the switch 105. As soon as the reversing lever 84 has shifted the reversing valve 25 a sufficient distance to admit fluid under pressure to the other side of the system, the initial flow of fluid in the reverse direction will shift the shuttle valve piston 91, causing an instantaneous dwell of sufficient duration to allow the switch 105 to close and the solenoid 100 to energize and the time relay 106 to be set in motion to open the bypass valve 95 so that the fluid under pressure from the pump may flow to both ends of the cylinder and also flow through the valve 50 into the exhaust thus causing the table 11 to dwell for a predetermined time interval as governed by the time relay 106.

After a predetermined time interval has elapsed, the time relay 106 breaks a circuit to deenergize the solenoid 100 and the released compression of the spring 99 closes the valve 95, after which the fluid under pressure is passed in the reverse direction to the cylinder 12, thus providing a table dwell of the desired and predetermined extent. It will be readily apparent from the foregoing disclosure that by adjustment of the relay 106, the extent of dwell at the ends of the table stroke may be adjusted as desired and the dwell may be readily obtained at both ends, or either end, or at neither end of the table stroke, by manipulation of the control lever 119. After the parts have been set, the grinding operation may continue to the desired extent, after which the control lever 70 is shifted in a clockwise direction to close the port 54 and thereby cut off the exhaust of fluid from the table cylinder 12, thus stopping the table 11 to facilitate removal of a finish ground work piece and the loading of a work piece to be ground thereinstead.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine having a longitudinally reciprocable table, means including a piston and cylinder to reciprocate said table, a reversing valve, pipes connecting said valve with opposite ends of the cylinder, means including pipes to convey fluid under pressure to and exhaust of fluid from said valve, a table actuated reversing lever to shift said reversing valve, a normally-closed solenoid-actuated by-pass valve shunted between said first mentioned pipes, an electric time delay relay, and a switch actuated by said reversing lever to start said time relay and to energize the solenoid to open said by-pass valve to provide a predetermined but adjustable dwell at the ends of the table stroke.

2. In a grinding machine having a longitudinally reciprocable table, means including a piston and cylinder to reciprocate said table, a reversing valve, pipes connecting said valve with opposite ends of the cylinder, means including pipes to convey fluid under pressure to and exhaust of fluid from said valve, a table actuated reversing lever to shift said reversing valve, a normally-closed solenoid-actuated by-pass valve shunted between said first mentioned pipes, an electric time delay relay, and a switch actuated by said reversing lever to start said time relay and to energize the solenoid to open said by-pass valve so that both pressure and exhaust pipes are interconnected with both ends of said cylinder to provide a predetermined but adjustable dwell at the ends of the table stroke.

3. In a grinding machine having a longitudinally reciprocable table, means including a fluid pressure piston and cylinder to reciprocate said table, means including a reversing valve to control the admission to and exhaust of fluid from said cylinder, a table actuated reversing lever to shift said valve into a reverse position, a normally-closed by-pass valve interconnected between said reversing valve and the opposite ends of said cylinder, a solenoid to open said by-pass valve, an adjustable electric time delay relay, and a normally open switch which is actuated by and in timed relation with said reverse lever to start said time relay and to energize said solenoid to open said by-pass valve so that the end chambers of the cylinder are interconnected both with each other and with the fluid pressure and exhaust pipes so as to provide a predetermined but adjustable dwell at the end of the table stroke as determined by the setting of the adjustable time delay relay.

4. In a grinding machine having a longitudinally reciprocable table, means including a fluid pressure piston and cylinder to reciprocate said table, means including a reversing valve to control the admission to and exhaust of fluid from said cylinder, a table actuated reversing lever to shift said valve into a reverse position, a normally closed by-pass valve interconnected between said reversing valve and the opposite ends of said cylinder, a solenoid to open said by-pass valve, an adjustable electric time delay relay, and a normally open switch which is actuated by and in timed relation with said reverse lever to start said time relay and to energize said solenoid to open said by-pass valve so that the end chambers of the cylinder are interconnected both with each other and with the fluid pressure and exhaust pipes so as to provide a predetermined but adjustable dwell at the end of the table stroke as determined by the setting of the adjustable time delay relay, said time relay being connected to deenergize said solenoid after a predetermined time interval to close said by-pass and thereby start the flow of fluid under pressure to the opposite end of the cylinder.

5. In a grinding machine as claimed in claim 1, the combination with the parts and features therein specified, of a cam to actuate the switch, a mechanism including a pair of dogs to actuate said cam in timed relation with the movement of the reversing lever, and means for positioning one or both of said dogs in an operative position to actuate the cam and switch to produce a predetermined dwell at either or both ends of the table stroke.

6. In a grinding machine as claimed in claim 1, the combination with the parts and features therein specified, of a slidably mounted cam to actuate the switch, a mechanism including a pair of dogs which may be actuated by and in timed relation with said reversing lever to actuate the dwell control switch, and manually operable means to position said dogs so as to actuate said cam and switch to produce a predetermined dwell at either or both ends of the table stroke.

7. In a grinding machine as claimed in claim 1, the combination with the parts and features therein specified, of a slidably mounted cam to actuate the switch, yieldable means normally to hold said cam in a central position, a mechanism including a pair of dogs which may be actuated by and in timed relation with said reversing lever to actuate the dwell control switch, and manually operable means to position said dogs so as to actuate said cam and switch to produce a predetermined dwell at either or both ends of the table stroke.

8. In a grinding machine as claimed in claim 1, the combination with the parts and features therein specified, of a slidably mounted cam to actuate the switch, a pair of adjustable dogs to move said cam, an arm movable with the reversing lever, said dogs being so shaped that either or both dogs may be positioned in the path of said arm or both dogs may be positioned out of the path of said arm, and a manually operable control lever to position said dogs so as to obtain a predetermined dwell at either end or at both ends of the table stroke.

9. In a grinding machine as claimed in claim 1, the combination with the parts and features therein specified, of a slidably mounted cam to actuate the switch, a pair of balanced springs normally to hold said cam in a central position with the switch open, a pair of adjustable dogs to move said cam, an arm movable with the reversing lever, said dogs being so shaped that either or both dogs may be positioned in the path of said arm or both dogs may be positioned out of the path of said arm, and a manually operable control lever to position said dogs so as to obtain a predetermined dwell at either end or at both ends of the table stroke.

WALLACE H. WOOD.
CARL G. FLYGARE.